United States Patent [19]

Forslund et al.

[11] Patent Number: 4,913,577
[45] Date of Patent: Apr. 3, 1990

[54] ELBOW JOINT OF AN INDUSTRIAL ROBOT

[75] Inventors: Karl-Erik Forslund; Klas Klangeby, both of Västerås, Sweden

[73] Assignee: Asea Brown Boveri AB, Sweden

[21] Appl. No.: 195,150

[22] Filed: May 18, 1988

[30] Foreign Application Priority Data

May 20, 1987 [SE] Sweden ................................ 8702082

[51] Int. Cl.⁴ ............................................. F16C 11/06
[52] U.S. Cl. ................................... 403/158; 403/16
[58] Field of Search ............... 403/158, 161, 156, 154, 403/157, 259, 370, 16

[56] References Cited

U.S. PATENT DOCUMENTS

| | | | |
|---|---|---|---|
| 639,415 | 12/1899 | Lutz | 403/156 X |
| 1,412,058 | 4/1922 | Johnson | 403/16 X |
| 2,382,679 | 8/1945 | Tollman | 403/158 |
| 2,562,327 | 7/1951 | Moore | 403/259 X |
| 3,594,851 | 7/1971 | Swatton | 403/156 X |
| 3,600,015 | 8/1971 | McMullen | 403/156 |
| 3,903,754 | 9/1975 | Morroni | |
| 3,980,321 | 9/1976 | Hamilton | 403/156 X |
| 4,306,466 | 12/1981 | Coveney | 403/259 X |
| 4,507,005 | 3/1985 | Siewart et al. | 403/16 |
| 4,743,138 | 5/1988 | Goy | 403/16 X |

FOREIGN PATENT DOCUMENTS 2560546  9/1985  France .

Primary Examiner—Kenneth J. Dorner
Assistant Examiner—José V. Chen
Attorney, Agent, or Firm—Watson, Cole, Grindle & Watson

[57] ABSTRACT

An elbow joint of an industrial robot comprises a first arm part which is yoke-formed at the joint and an end of a second arm part located between the yokes. On the sides of the end of the second arm part which face the respective yokes, bearing seats are provided in which shaft journals are journalled. The shaft journals are connected together by a pull rod, which extends through the end and the shaft journals, and are received in, and extend through, through-holes in the respective yokes. The shaft journals are fixed to the yokes by means of nuts threaded onto the accessible part of the shaft journals on the opposite side of the respective yokes.

2 Claims, 2 Drawing Sheets

ELBOW JOINT OF AN INDUSTRIAL ROBOT

BACKGROUND OF THE INVENTION

An industrial robot normally comprises an arm having several degrees of freedom of movement, the free end of the arm supporting a hand in the form of a gripper or the like. The arm often comprises a first arm part and a second arm part interconnected by an elbow joint. This invention relates to an elbow joint of an industrial robot.

In industrial robots it is a requirement that the robot arm can repeat, with great accuracy, programmed patterns of movement. If changes-even small changes-in the programmed final position of the hand occur as a result of replacement or repair of parts in, for example, the arm, this may require reprogramming of the robot, which is very time-consuming in the case of complicated patterns of movement of the robot arm.

SUMMARY OF THE INVENTION

The present invention relates to a device by means of which an arm part in the robot arm, after replacement, can be adjusted with satisfactory tolerance to the same position as earlier, thus avoiding reprogramming.

According to the invention, the robot arm comprises a first arm part, which is yoke-shaped at the elbow joint, and an end of a second arm part, which end is fitted between the yokes. The invention is characterized in that the end of the second arm part, on the sides thereof facing the respective yokes, is provided with bearing seats in which sleeve-shaped shaft journals are journalled. The shaft journals are rotatably fixed to the end by means of a pull rod extending through the end. The shaft journals are fitted into through-holes in the respective yoke and fixed there by nuts screw-threadedly connected onto the accessible part of the shaft journals on the opposite side of the respective yoke.

By loosening one nut and tighening the other, the connected shaft journals in the yoke holes are displaced in one or the other direction and the first arm part is laterally moved with respect to the second arm part. In this way, a lateral adjusting of up to about two millimeters can be achieved, which is sufficient to avoid reprogramming after relacement of, for example, an arm part.

BRIEF DESCRIPTION OF THE DRAWINGS

The invention will be most readily understood with reference to the accompanying drawings, wherein.

DESCRIPTION OF THE PREFERRED EMBODIMENT

Figure 1:
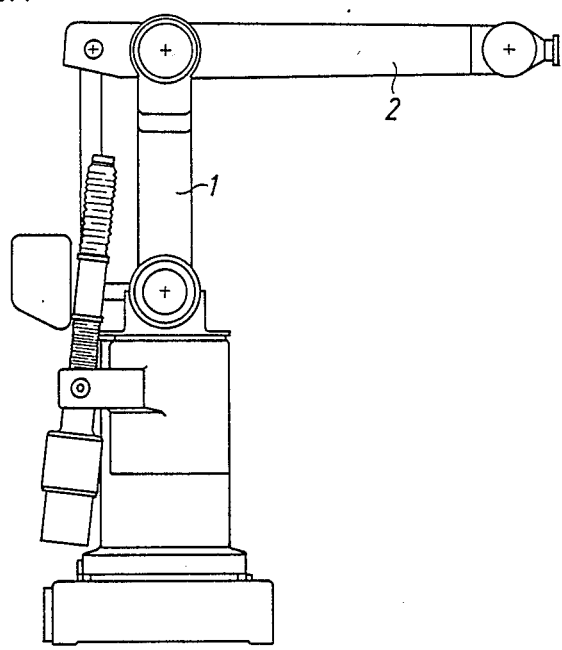
FIGS. 1 and 2 show respective side and front views of a well-known industrial robot which can utilize the elbow joint of the present invention.
Figure 2:
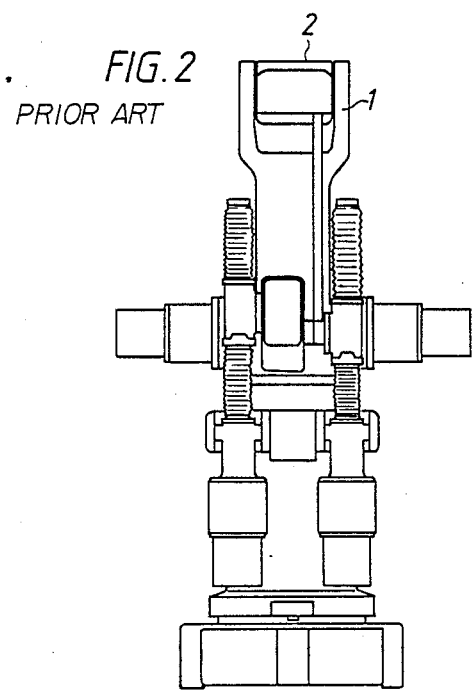
Figure 3:
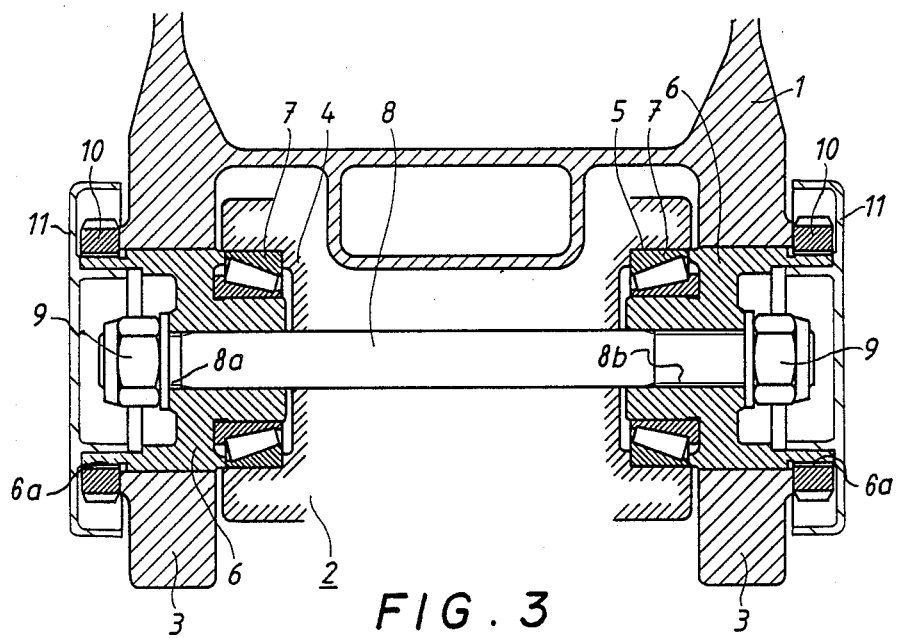
FIG. 3 shows a schematic view of the preferred embodiment of elbow joint according to the invention.

FIGS. 1 and 2 show a known industrial robot which can utilize the elbow joint according to the invention to connect a first arm part 1, which provides yokes 3 at one end thereof (see FIG. 3), with the end 4 of a second arm part 2, which end 4 can fit between the yokes 3. As can be seen in FIG. 3, which shows a preferred embodiment of elbow joint according to the present invention, the end 4 is provided with bearing seats 5 in which shaft journals 6 are journalled by means of conical bearings 7. A pull rod 8 having threaded ends 8a, 8b passes through the end 4 and the shaft journals 6. Nuts 9, provided with suitable locking washers, are threadedly connected to the opposite ends of the pull rod 8 and, by adjusting these nuts 9, the shaft journals 6 can be pressed against the bearing seats 5 and the backlash between the journals 6 and the seats 5 can be adjusted. The yokes 3 are provided with through-holes for receiving the shaft journals 6 which project outwardly of the yokes 3. These outwardly projecting parts of the shaft journals 6 are threaded (see 6a) and provided with nuts 10 and are protected by covers 11. By tightening the nut 10 on one side of the elbow joint and loosening the corresponding nut 10 on the other side of the elbow joint, the arm part 2 can be laterally moved in relation to the arm part 1, whereby the maximally required lateral movement can be estimated at approximately two millimeters.

The device is very practical since it permits simple assembly and dismantling of the elbow joint. To replace an arm part, for example, the covers 11 are first removed followed by the nuts 9 and 10. The pull rod 8 is also removed. The shaft journals 6, which do not rotate but are fitted in their respective holes in the yoke 3 by wringing fit, are removed by means of a withdrawing tool (not shown) which is threadedly connected to an internal thread in the through-holes of the shaft journals 6 through which the pull rod 8 projects in the assembled joint. Thereafter, the arm parts 1 and 2 are separated.

Assembly is performed in the opposite sequence. The arm part 2 is fitted in between the yokes 3. The shaft journals 6 are inserted through the holes in the yokes 3 and are connected together by the pull rod 8, the nuts 9 being tightened to ensure that a suitable backlash is obtained in the elbow joint. Thereafter, the nuts 10 are screwed on and the arm part 2 is adjusted in relation to the arm part 1. Finally, the covers 11 are fitted on.

Various modifications can be made to the illustrated arrangement and all such modifications falling within the scope of the following claims represent aspects of this invention.

What is claimed is:

1. An industrial robot which comprises
   a first arm part having spaced-apart first and second yoke means at an end thereof, said first and second yoke means having aligned through-holes therein,
   a second arm part which has an end that is positioned between said first and second yoke means of said first arm part, said end of said second arm part having first and second sides which respectively face said first and second yoke means, said first and second sides forming respective bearing seats therein, and a bore which extends through said end of said second arm part from said first side to said second side thereof, and
   elbow joint means connecting said end of said second arm part to said first and second yoke means of said first arm part, said elbow joint means comprising first and second shaft journals which respectively extend through said through-holes in said first and second yoke means and are rotatably journaled within the bearing seats within said first and second sides of said end of said second arm part, said first and second shaft journals having threaded portions which extend outwardly of the respective first and second yoke means through which they extend, a pull rod means which extends through said first and second shaft journals and said bore in said end of said second arm part, said pull rod means rotatably securing said first and second shaft journals in said bearing seats, and first and second nut means which are respectively connected to the threaded portions of said first and second shaft journals, said shaft journals and second arm part being laterally movable in relation to the first arm part in response to a loosening of one of said first and second nut means and a tightening of the other of said first and second nut means.

2. An industrial robot according to claim 1, wherein said pull rod has opposite ends which are threaded, and including third and fourth nut means which are respectively engaged with the threaded opposite ends of said pull rod to adjust the positioning of said first and second shaft journals relative to the bearing seats in which they extend.

\* \* \* \* \*